US007155669B1

(12) United States Patent
Nakagiri et al.

(10) Patent No.: US 7,155,669 B1
(45) Date of Patent: Dec. 26, 2006

(54) SYSTEM, METHOD AND APPARATUS FOR CHANGING OUTPUT SIZE OF AN ELECTRONICALLY TRANSMITTED DOCUMENT

(75) Inventors: Koji Nakagiri, Kawasaki (JP); Satoshi Nishikawa, Yokohama (JP); Yasuo Mori, Tokyo (JP); Yasuhiro Kujirai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/489,937

(22) Filed: Jan. 24, 2000

(30) Foreign Application Priority Data

Jan. 28, 1999 (JP) ................................. 11-020822

(51) Int. Cl.
*G06F 15/00* (2006.01)
*G06F 17/00* (2006.01)

(52) U.S. Cl. .................... 715/517; 358/401; 358/449; 380/246; 709/227

(58) Field of Classification Search ................ 715/517, 715/500, 501.1; 380/246; 358/434, 403, 358/1.15, 401, 449; 235/375; 709/227
See application file for complete search history.

(56) References Cited

U.S. PATENT DOCUMENTS

| 5,019,916 | A | * | 5/1991 | Ogura | 358/401 |
| 5,339,169 | A | * | 8/1994 | Meguro et al. | 358/403 |
| 5,418,626 | A | * | 5/1995 | Semasa | 358/451 |
| 5,517,324 | A | * | 5/1996 | Fite et al. | 358/434 |
| 5,621,894 | A | * | 4/1997 | Menezes et al. | 709/227 |
| 5,659,164 | A | * | 8/1997 | Schmid et al. | 235/375 |
| 6,188,766 | B1 | * | 2/2001 | Kocher | 380/246 |
| 6,493,103 | B1 | * | 12/2002 | Toyoda et al. | 358/1.15 |
| 6,559,971 | B1 | * | 5/2003 | Watts et al. | 358/1.2 |
| 6,564,321 | B1 | * | 5/2003 | Bobo, II | 713/168 |

FOREIGN PATENT DOCUMENTS

JP   0 578 184 A1 * 12/1994

OTHER PUBLICATIONS

Bar Code Photocopier And Applications, IBM Technical Disclosure Bulletin, Dec. 1989, vol. 32, Issue 7, pp. 305-307.*
Gittlen, Sandra, Software takes a bite out of fax costs, Network World, Jun. 2, 1997, vol. 14, issue 22, p. 43.*

* cited by examiner

*Primary Examiner*—William Bashore
(74) *Attorney, Agent, or Firm*—Fitzpatrick, Cella, Harper & Scinto

(57) ABSTRACT

Output image data, which is composed of a plurality of pages, and output configuring information are stored temporarily in a file spool in an intermediate data format using an information processing apparatus. The size in which a prescribed page is to be output is acquired by a spool file manager from the temporarily stored output configuring information of the output image data in the intermediate data format. The size of each page of the output image data is changed by a despooler based upon the output size acquired.

28 Claims, 19 Drawing Sheets

FIG. 8

| Canon MEDIO LIPS-D1(FAX) | ? X |
|---|---|

TRANSMISSION SETTINGS | EDIT TELEPHONE DIRECTORY LIST | COVER PAGE

NAME OF TRANSMISSION DESTINATION(N): name100

FAX NO. (X): 03-0000-0100

[ADD TO TELEPHONE DIRECTORY LIST(B)]

[ADD TO TRANSMISSION-DESTINATION LIST(I)]

TRANSMISSION-DESTINATION LIST(L): 4

| name001 | 03-0000-0001 |
| name002 | 03-0000-0002 |
| name003 | 03-0000-0003 |
| name100 | 03-0000-0100 |

[SELECT FROM TELEPHONE DIRECTORY LIST(S)...]

[DELETED FROM TRANSMISSION-DESTINATION LIST(R)]

RESOLUTION  ○ ULTRAFINE(U)
            ⊙ FINE(F)

[OK]  [CANCEL]  [APPLICATION(A)]  [HELP]

FIG. 10

TELEPHONE DIRECTORY LIST DATABASE SECTION

INDIVIDUAL INFORMATION 1
  (NAME OF INDIVIDUAL, FAX NO.,....)

...
  INDIVIDUAL INFORMATION K
  (NAME OF INDIVIDUAL, FAX NO.,....)

GROUP INFORMATION 1
  (NAME OF GROUP, TRANSMISSION-DESTINATION NAME 1,
   TRANSMISSION-DESTINATION NAME 2,....)

...
  GROUP INFORMATION L
  (NAME OF GROUP, TRANSMISSION-DESTINATION NAME 1,
   TRANSMISSION-DESTINATION NAME 2,....)

JOB-BY-JOB SETTINGS SECTION

JOB 1 INFORMATION
  (JOB ID, TRANSMISSION-DESTINATION INFORMATION,
   Cover Type, COVER-PAGE PLOT DATA)

...
  JOB M INFORMATION
  (JOB ID, TRANSMISSION-DESTINATION INFORMATION,
   Cover Type, COVER-PAGE PLOT DATA)

FIG. 11

| COVER-PAGE SETTINGS | Cover Type |
|---|---|
| DO NOT ATTACH | 0 |
| ATTACH DIFFERENT PAGE FOR EACH SENDER | 1 |
| ATTACH SAME PAGE FOR ALL | 2 |

JOB SETTINGS INFORMATION SECTION
Job ID:              JOB IDENTIFIER
Destination:         OUTPUT-DESTINATION SETTING
Paper Size Option:   PAPER-SIZE OPTION
Paper Size:          PAPER-SIZE
...

PAGE SETTINGS INFORMATION SECTION
[CONFIGURATION 1]
Dev Mode ID:  PAGE SETTINGS IDENTIFIER
Paper:        PAPER SIZE
Orientation:  PAPER ORIENTATION
...
[CONFIGURATION 2]
Dev Mode ID:  PAGE SETTINGS IDENTIFIER
Paper:        PAPER SIZE
Orientation:  PAPER ORIENTATION
...

PLOT-OBJECT INFORMATION SECTION
[PAGE SETTING IDENTIFIER 1]
Dev Mode ID:  PAGE SETTINGS IDENTIFIER
Record 1, Record 2,...
[PAGE SETTING IDENTIFIER 2]
Dev Mode ID:  PAGE SETTINGS IDENTIFIER
Record 1, Record 2,...

[Objects]
Font1, Font2,...
Pen1, Pen2,...
Brush1, Brush2,...

1202

| Paper Size Option | MEANING |
|---|---|
| 0 | PAPER SIZE ON PER-PAGE BASIS |
| 1 | PAPER SIZE OF LEADING PAGE |
| 2 | SIZE SPECIFIED IN Paper Size |

FIG. 14

| NAME OF VARIABLE | MEANING |
|---|---|
| Cover Type | 0 : DO NOT ATTACH |
| | 1 : ATTACH DIFFERENT PAGE FOR EACH SENDER |
| | 2 : ATTACH SAME PAGE FOR ALL |
| Job Copies | NUMBER OF DIVIDED JOBS |

FIG. 18

```
(JOB CONTROL POSITION)

OUTPUT = FAX          : OUTPUT DESTINATION

DIAL = 0300000001     : TELEPHONE NO.
```
```
(PLOT-DATA PORTION)

JOB START COMMAND

INITIALIZE COMMAND

PAGE START COMMAND

COVER - PAGE PLOT DATA

PAGE END COMMAND

PAGE START COMMAND

PLOT COMMAND 1

...
PAGE END COMMAND

...
JOB END COMMAND
```

SYSTEM, METHOD AND APPARATUS FOR CHANGING OUTPUT SIZE OF AN ELECTRONICALLY TRANSMITTED DOCUMENT

BACKGROUND OF THE INVENTION

This invention relates to an information processing system having a multifunction apparatus, which includes a facsimile function, and an information processing apparatus, a method of controlling this system, an information processing apparatus and a method of controlling the same, and a computer-readable memory.

When facsimile transmission is performed using a multifunction apparatus having a facsimile function according to the prior art, documents having paper sizes of a plurality of types can be transmitted with their paper sizes mixed. This makes it possible to transmit documents of a plurality of different paper sizes.

However, if documents of a plurality of mixed paper sizes for transmission are to be transmitted upon making the paper sizes uniform, it is necessary that the documents for transmission be created again in the case of the conventional multifunction apparatus described above. Further, in order to make the size of a cover page that is attached to a document to be transmitted the same as that of the paper of the document, it is necessary to prepare a cover page having a size the same as that of each paper size that is capable of being transmitted. Thus, though documents having a plurality of different paper sizes can be transmitted, the conventional apparatus is not easy to use and documents cannot be transmitted efficiently.

SUMMARY OF THE INVENTION

Accordingly, an object of the present invention is to provide an information processing system and a method of controlling the same, an information processing apparatus and a method of controlling the same, and a computer-readable memory that make it possible to transmit documents efficiently.

According to the present invention, the foregoing object is attained by providing an information processing system having a multifunction apparatus, which is equipped with a facsimile function, and an information processing apparatus, the system comprising: temporary storing means for temporarily storing, on a storage medium in an intermediate data format, output image data composed of a plurality of pages as well as output configuring information; acquisition means for acquiring output size of a prescribed page from the output configuring information of the output image data in the intermediate data format stored temporarily by the temporary storing means; changing means for changing the size of each page of the output image data based upon the output size acquired by the acquisition means.

According to the present invention, the foregoing object is attained by providing an information processing apparatus connected to a multifunction apparatus equipped with a facsimile function, the information processing apparatus comprising: temporary storing means for temporarily storing, on a storage medium in an intermediate data format, output image data composed of a plurality of pages as well as output configuring information; acquisition means for acquiring output size of a prescribed page from the output configuring information of the output image data in the intermediate data format stored temporarily by the temporary storing means; and changing means for changing the size of each page of the output image data based upon the output size acquired by the acquisition means.

According to the present invention, the foregoing object is attained by providing a method of controlling an information processing system having a multifunction apparatus, which is equipped with a facsimile function, and an information processing apparatus, the method comprising: a temporary storing step of temporarily storing, in the information processing apparatus in an intermediate data format, output image data composed of a plurality of pages as well as output configuring information; an acquisition step of acquiring output size of a prescribed page from the output configuring information of the output image data in the intermediate data format stored temporarily in the information processing apparatus; and a changing step of changing the size of each page of the output image data based upon the output size acquired at the acquisition step.

According to the present invention, the foregoing object is attained by providing a method of controlling an information processing apparatus connected to a multifunction apparatus equipped with a facsimile function, the method comprising: a temporary storing step of temporarily storing, on a storage medium in an intermediate data format, output image data composed of a plurality of pages as well as output configuring information; an acquisition step of acquiring output size of a prescribed page from the output configuring information of the output image data in the intermediate data format stored temporarily on the storage medium; and a changing step of changing the size of each page of the output image data based upon the output size acquired at the acquisition step.

According to the present invention, the foregoing object is attained by providing a computer-readable memory storing program code for control of an information processing system having a multifunction apparatus, which is equipped with a facsimile function, and an information processing apparatus, the memory having: program code of a temporary storing step of temporarily storing, in the information processing apparatus in an intermediate data format, output image data composed of a plurality of pages as well as output configuring information; program code of an acquisition step of acquiring output size of a prescribed page from the output configuring information of the output image data in the intermediate data format stored temporarily in the information processing apparatus; and program code of a changing step of changing the size of each page of the output image data based upon the output size acquired at the acquisition step.

According to the present invention the foregoing object is attained by providing a computer-readable memory storing program code for control of an information processing apparatus connected to a multifunction apparatus equipped with a facsimile function the memory having: program code of a temporary storing step of temporarily storing, on a storage medium in an intermediate data format output image data composed of a plurality of pages as well as output configuring information: program code of an acquisition step of acquiring output size of a prescribed page from the output configuring information of the output image data in the intermediate data format stored temporarily on the storage medium; and program code of a changing step of changing the size of each page of the output image data based upon the output size acquired at the acquisition step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 8 is a diagram showing a configuration window according to the embodiment of the present invention;

FIG. 10 is a diagram illustrating information spooled in a facsimile information file according to the embodiment of the present invention;

FIG. 11 is a diagram illustrating setting parameters of a cover page according to the embodiment of the present invention;

FIG. 12 is a diagram illustrating information spooled in a spool file according to the embodiment of the present invention;

FIG. 14 is a diagram showing the content of data which the spool file manager acquires from a printer driver according to the embodiment of the present invention;

FIG. 18 is a diagram showing the content of transmission data according to the embodiment of the present invention.

DESCRIPTION OF THE PREFERRED EMBODIMENT

A preferred embodiment of the present invention will now be described in detail with reference to the drawings.

Before an image processing apparatus 3000 according to this embodiment is described, we will describe the configuration of an information processing system applicable to the present invention and comprising a multifunction apparatus 4000, which is equipped with a facsimile transmission function, and the information processing apparatus 3000.

Figure 1:
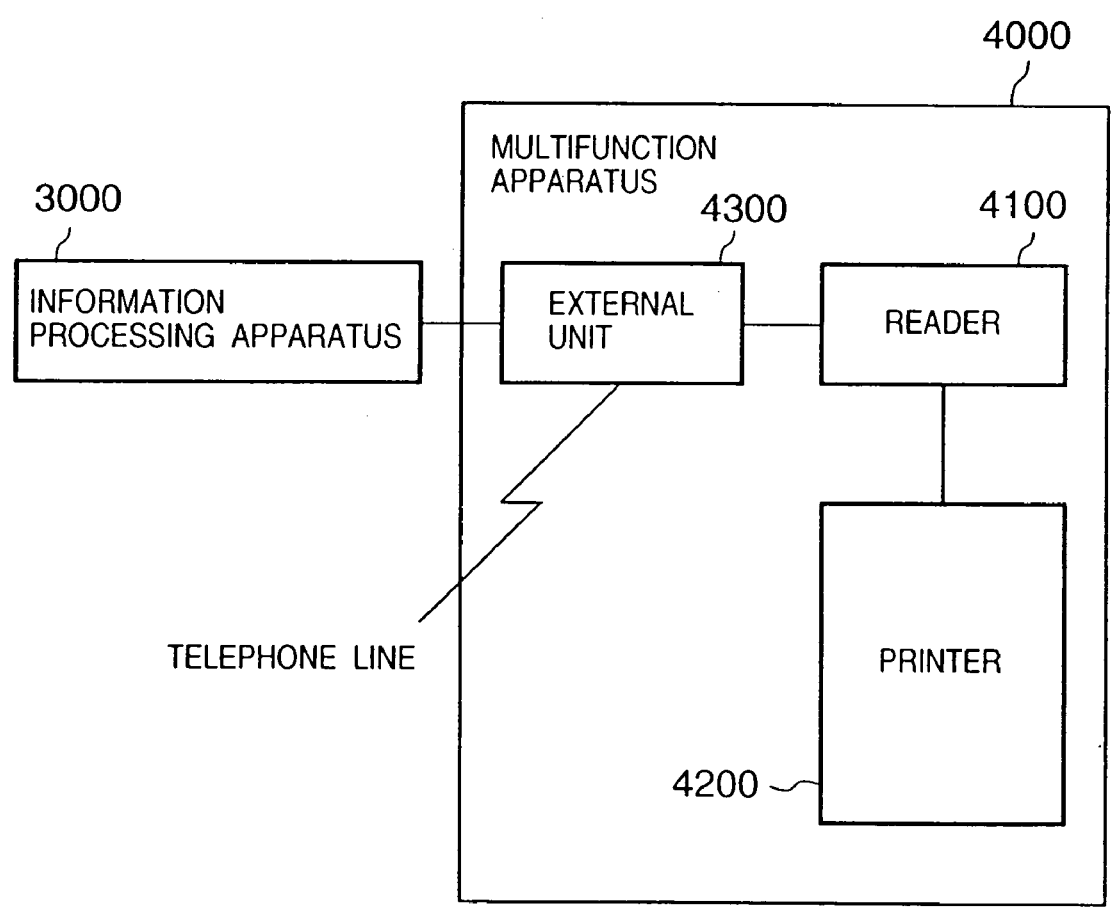
FIG. 1 is a block diagram illustrating the configuration of an information processing system applicable to an embodiment of the present invention.

FIG. 1 is a block diagram illustrating the configuration of an information processing system applicable to an embodiment of the present invention.

As shown in FIG. 1, the multifunction apparatus 4000 includes a reader 4100, a printer 4200 and an external unit 4300. The reader 4100 is an image input unit for reading the image of a document and outputting image data. The printer 4200 is an image output unit, which has printing paper cassettes of a plurality of types, for outputting image data in the form of a visible image on the printing paper in response to print command. The external unit 4300 is electrically connected to the reader 4100 and has a variety of functions. The external unit 4300 is connected to the information processing apparatus 3000 and is capable of sending data to and receiving data from the information processing apparatus 3000. Further, the external unit 4300 is capable of communicating via a telephone line.

The details of construction of the reader 4100 and printer 4200 will be described with reference to FIG. 2.

Figure 2:
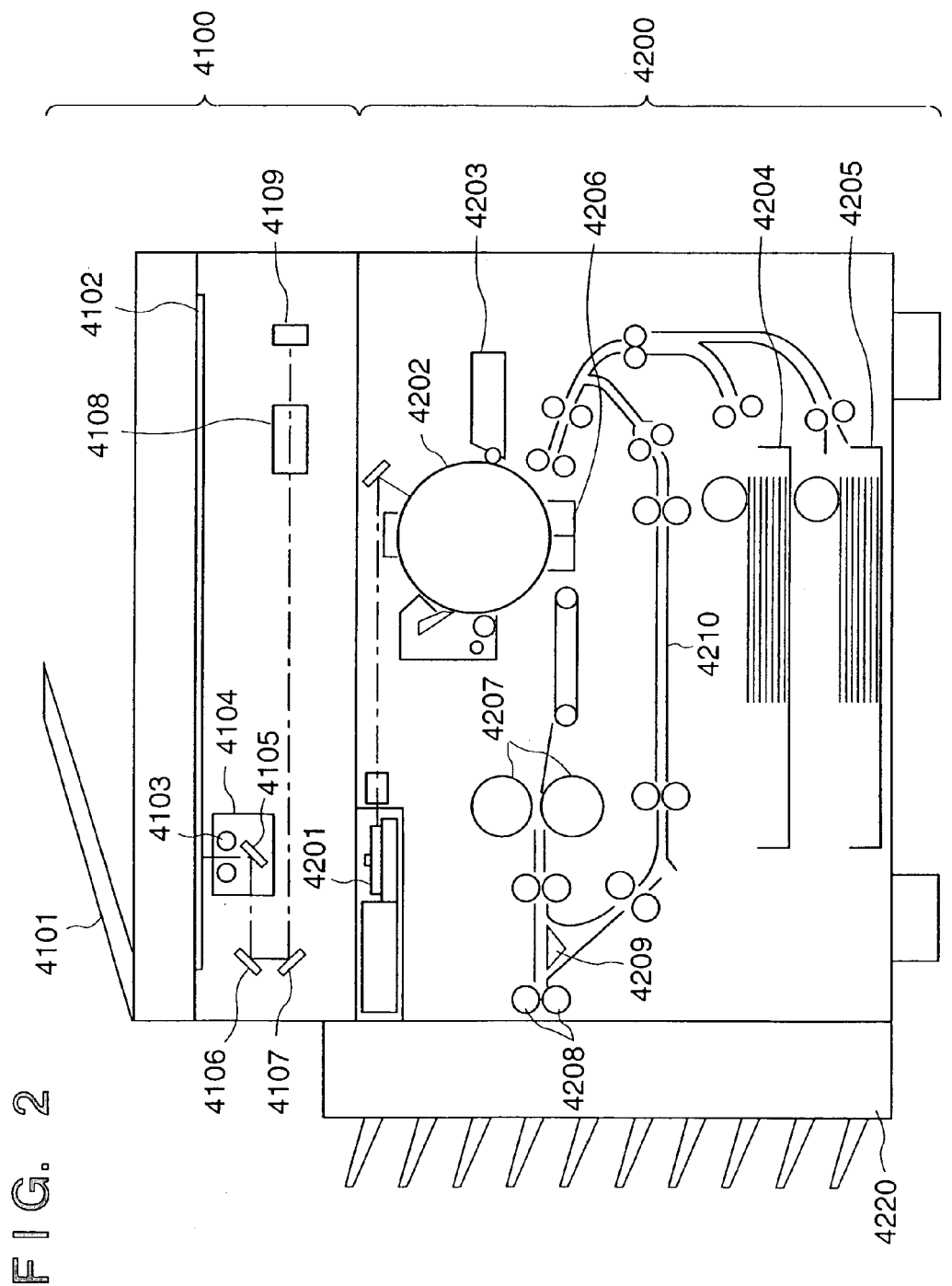
FIG. 2 is a diagram showing the details of construction of a reader and printer applicable to the embodiment of the present invention.

FIG. 2 is a diagram showing the details of construction of the reader 4100 and printer 4200 applicable to the embodiment of the present invention.

Documents stacked on a document feeder 4101 of the reader 4100 are transported to a glass platen 4102 one sheet at a time. When a document is transported to a predetermined position of the glass platen 4102, a scanner lamp 4103 lights and a scanner unit 4104 moves, thereby exposing and scanning the document. Light reflected from the document enters a CCD image sensor 4109 (referred to as a "CCD" below) via mirrors 4105, 4106, 4107 and a lens 4108.

Next, the image signal that has been input to the printer 4200 is converted to an optical signal, which has been modulated by an exposure controller 4201, and the optical signal irradiates a photosensitive drum 4202. A latent image formed on the photosensitive drum 4202 by the irradiating light is developed by a developing device 4203. At a timing in conformity with the leading edge of the latent image, transfer paper is transported by a transfer-paper stacker 4204 or 4205 and the developed image is transferred to the paper at a transfer unit 4206. After the transferred image is fixed on the transfer paper at a fixing unit 4207, the paper is ejected to the exterior of the apparatus from a paper ejection unit 4208.

Transfer paper output from the paper ejection unit 4208 is ejected into the proper bins if a sorter 4220 is working or into the uppermost bin of the sorter if the sorter is not working. If images read in one after another are to be output onto both sides of a single sheet of transfer paper, the sheet of transfer paper that has been fixed by the fixing unit 4207 has its transport direction reversed once it has been transported as far as the paper ejection unit 4208 and then is transported via a transport-direction switching member 4209 to a stacking portion 4210 for resupplying the paper. When the next document is prepared, the document image is read through a process similar to that described above and the transfer paper is supplied from the stacking portion 4210 for resupplying paper. As a result, two document images are printed on the same output sheet of paper, i.e., one image is printed on the front side and one image on the back side of the sheet of paper.

The details of the construction of the external unit 4300 will now be described with reference to FIG. 3.

Figure 3:
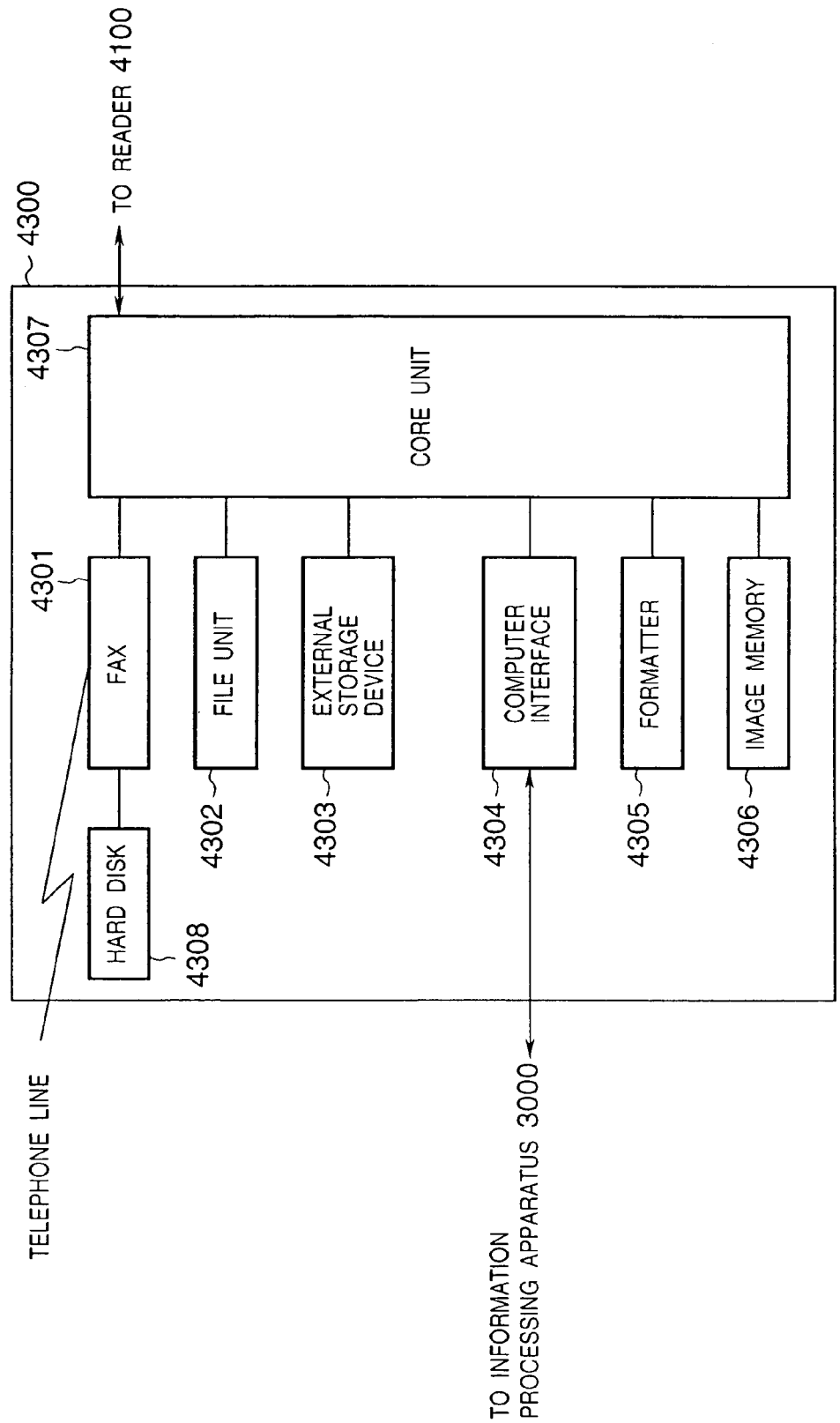
FIG. 3 is a block diagram illustrating the details of construction of an external unit applicable to the embodiment of the present invention.

FIG. 3 is a block diagram illustrating the details of construction of the external unit 4300 applicable to the embodiment of the present invention.

The external unit 4300 is connected to the reader 4100 by a cable and controls signals and functions by an internal core unit 4307. The external unit 4300 includes a hard disk 4308 for storing various information, a facsimile unit 4301 for facsimile transmission and reception, a file unit 4302 for converting various document information to electrical signals and saving the information on a magneto-optic disk (external storage device 4303), a formatter 4305 for expanding code from the information processing apparatus 3000 into image information, a computer interface 4304 for interfacing the information processing apparatus 3000, an image memory 4306 for storing information from the reader 4100 and temporarily storing information sent from the information processing apparatus 3000, and the core unit 4307 for controlling each of these components.

The details of the construction of the information processing apparatus 3000 will be described with reference to FIG. 4.

Figure 4:
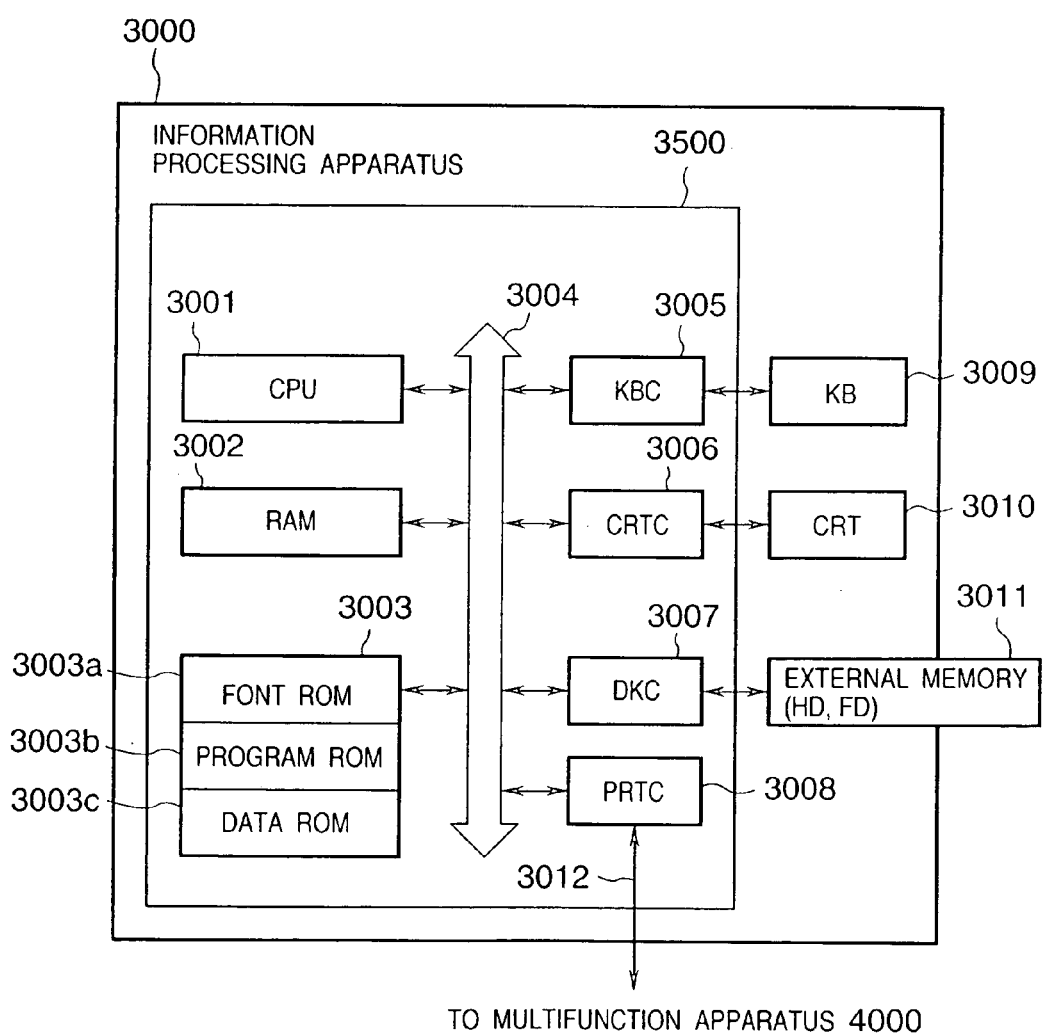
FIG. 4 is a block diagram illustrating the details of construction of an image processing apparatus according to the embodiment of the present invention.

FIG. 4 is a block diagram illustrating the details of construction of the information processing apparatus 3000 according to this embodiment of the present invention.

The information processing apparatus 3000 includes a CPU 3001, a RAM 3002, a ROM 3003, a keyboard controller (KBC) 3005, a CRT controller (CRTC) 3006, a disk controller (DKC) 3007, a printer controller (PRTC) 3008, a keyboard (KB) 3009, a CRT display (CRT) 3010 and an external memory 3011.

The CPU 3001 is a central processing unit which performs overall control of various devices connected to a system bus 3004. The CPU 3001 executes the processing of documents which contain a mixture of graphics, images, characters and tables (spreadsheets, etc.) based upon a document processing program that has been stored in a program ROM 3003b (described later) of ROM 3003 or in the external memory 3011. Further, the CPU 3001 executes processing to expand (rasterize) outline fonts in a display RAM provided in, say, the RAM 3002, and implements a WYSIWYG (What You See I What You Get) function (a function through which what appears on the CRT display screen can be printed in exactly the size and shape displayed).

Further, on the basis of commands designated by a mouse cursor (not shown) or the like on the CRT display 3010, the CPU 3001 opens various windows that have been registered and executes a variety of data processing. When printing is executed using the multifunction apparatus 4000, the user opens a window relating to printing settings and can configure the multifunction apparatus 4000 and set a printing processing method in regard to a printer driver, the setting including the selection of a printing mode.

The RAM 3002 functions as the main memory and work area of the CPU 3001. The ROM 3003 has a font ROM 3003a, the program ROM 300b and a data ROM 3003c. The font ROM 3003a or external memory 3011 store font data used when the above-mentioned document processing is executed. The program ROM 3003b or external memory 3011 store the operating system (OS), which is the program for controlling the CPU 3001. The data ROM 3003c or external memory 3011 stores various data used when processing such as the above-mentioned document processing is executed.

The keyboard controller 3005 controls inputs from the keyboard 3009 and from a pointing device, which is not shown. The CRT controller 3006 controls the display on the CRT display 3010. The disk controller 3007 controls access to the external memory 3011. The printer controller 3008, which is connected to the multifunction apparatus 4000 (external unit 4300) via a bidirectional interface 3012, executes processing for controlling communication with the multifunction apparatus 4000. The keyboard 3009 has a variety of keys.

The CRT display 3010 displays graphic, images, text and tables, etc. The external memory 3011, which is constituted by a hard disk (HD) or floppy disk (FD), etc., stores a booting program, various applications, fond data, user files, edited files and a printer control command generating program (referred to as a "printer driver" below), etc.

The CPU 3001, RAM 3002, ROM 3003, keyboard controller 3005, CRT controller 3006, disk controller 3007 and printer controller 3008 are provided in a computer control unit 3500.

Those functional components of the information processing apparatus 3000 that are typical printing processing functional components which execute the processing of a computer or the like connected, directly or through a network, to the printer of the multifunction apparatus 4000 will now be described with reference to FIG. 5.

Figure 5:
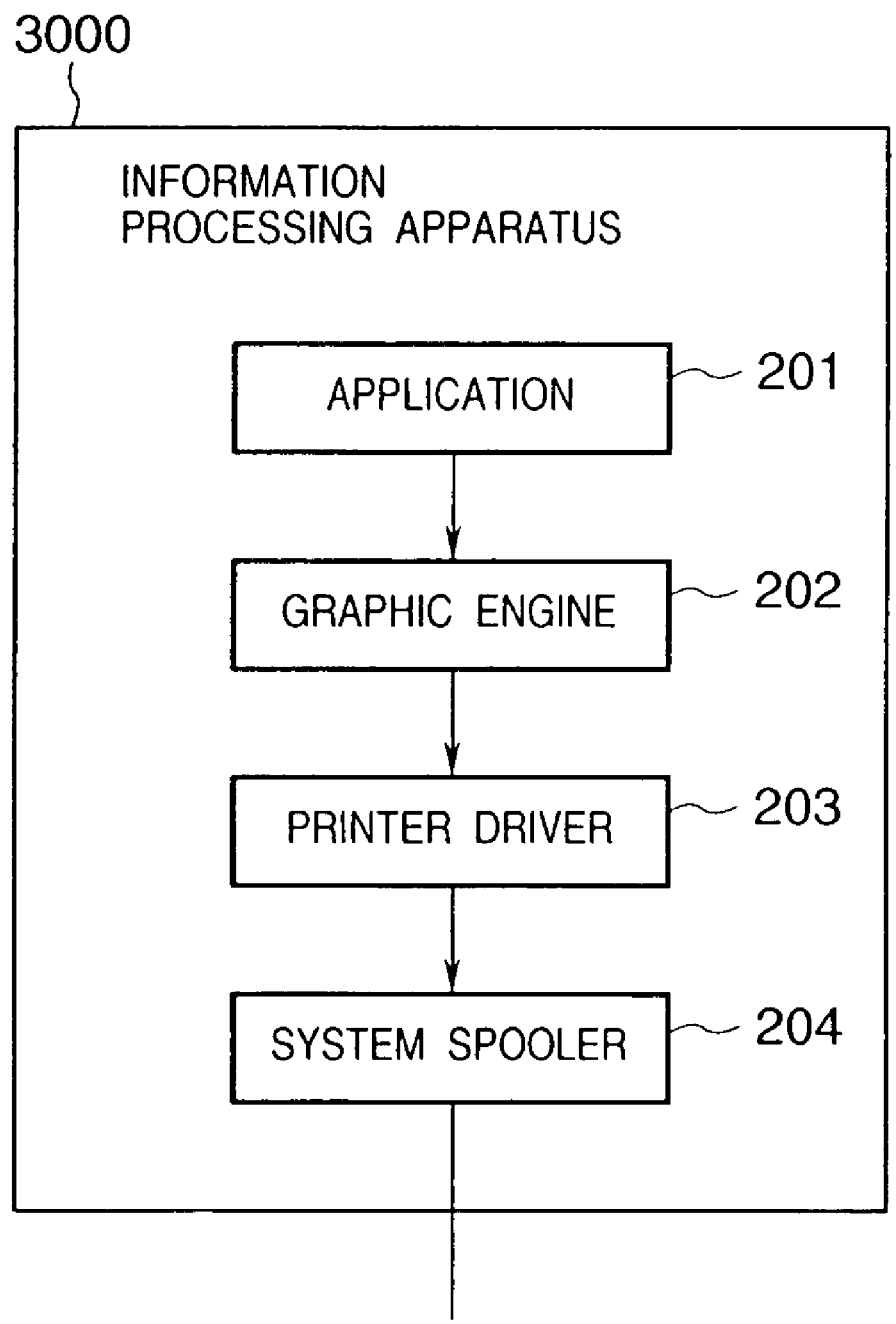
FIG. 5 is a block diagram illustrating the functional construction of print processing in the image processing apparatus according to the embodiment of the present invention.

FIG. 5 is a block diagram illustrating the functional construction of printing processing in the image processing apparatus according to the embodiment of the present invention.

In FIG. 5, an application 201, graphic engine 202, printer driver 203 and system spooler 204 exist as files preserved in the external memory 3011 of FIG. 4. These are program modules which, when they are to be executed, are loaded in the RAM 3002 and executed by the operating system and by modules which utilize these modules. The application 201 and the printer driver 203 can be added to and stored on a floppy disk or CD-ROM of the external memory 3011 or, via a network (not shown), on the hard disk of the external memory 3011.

Described next will be a procedure through which a document which the user has created using the application 201 is printed by the multifunction apparatus 4000.

First, the user instructs the operating system to launch the application 201. In response, the operating system loads the application 201, which has been stored in the external memory 3011, in the RAM 3002 and then launches the application. The user creates a document using the application 201, or opens an already existing document, and then selects an output destination in a printer selection window provided by the operating system or application.

Next, the user orders the application 201 to configure printing of the document. The application 201 notifies the graphic engine 202 of this order and the graphic engine 202 responds by loading the printer driver 203 corresponding to the selected printer from the external memory 3011 to the RAM 3002 and instructs the printer driver 203 to display a printing configuration window. The printer driver 203 then displays the configuration window. The user makes various settings in the configuration window and the printer driver 203 sends the specified settings information (this information will be referred to as "DEVMODE" below) back to the application 201 via the graphic engine 202.

Next, the user orders the application 201 to print the document. In order for the application 201 to instruct the printer driver 203 to configure printing, the application initializes the printer driver 203, using the previously acquired DEVMODE, via the graphic engine 202. The application 201 then sends a print command to the graphic engine 202 via a GDI (Graphic Device Driver), and the graphic engine 202 converts the received print command to a DDI (Device Driver Interface) and sends the print command to the printer driver 203.

On the basis of the DDI received from the graphic engine 202, the printer driver 203 converts the command of a control command, e.g., PDL (Page Description Language), that is capable of being recognized by the printer or multifunction apparatus. The control command obtained by the conversion is output to the multifunction apparatus 4000 as print data via the system spooler 204, which has been loaded in the RAM 3002 by the operating system, through the bidirectional interface 3012.

Figure 6:
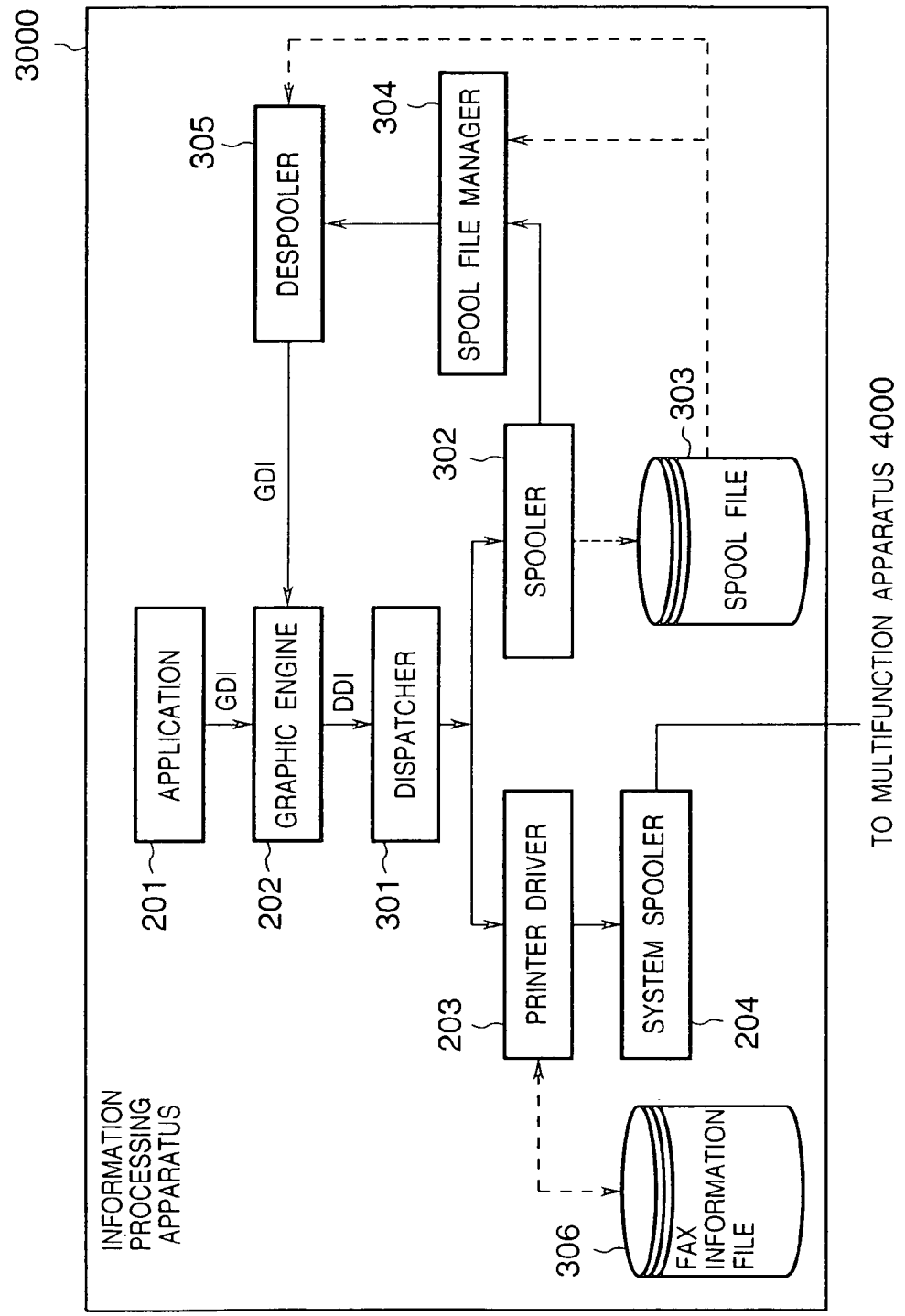
FIG. 6 is a block diagram illustrating the functional construction of the image processing apparatus according to the embodiment of the present invention.

Reference will now be had to FIG. 6 to describe functional components, which constitute a feature of the present invention, obtained by adding an arrangement, which spools print data from the application temporarily as intermediate code data, to the functional components of the information processing apparatus 3000 illustrated in FIGS. 4 and 5.

FIG. 6 is a block diagram illustrating the functional construction of the image processing apparatus according to the embodiment of the present invention.

The block diagram of FIG. 6 is obtained by expanding the functions shown in FIG. 5 and has means for temporarily generating a spool file 303, which comprises intermediate code, when a print command is sent from the graphic engine 202 to the printer driver 203. In FIG. 6, the content of the spool file 303 is manipulated and a despooler 305 executes actual printing based upon the manipulated content, whereby functions not possessed by the application can be implemented in regard to the print data from the application, these functions including adding on a cover page, transmitting data repeatedly to a plurality of facsimile transmission destinations, changing the size of the cover page, enlarging/reducing the body of the document, and processing conforming to the destination of an output from the multifunction apparatus 4000 (e.g., printout, FAX transmission, preservation on a hard disk, etc.).

The details of the construction of FIG. 6 will now be described.

When the user instructs the application 201 to perform printing (facsimile transmission), first the application 201 sends a printing start command (GDI: StartDoc) to a dispatcher 301 via the graphic engine 202. The dispatcher 301 calls a configuration window provided by the printer driver 203. The configuration windows of the printer driver 203 include the windows shown in FIGS. 7, 8 and 9.

Each of these windows will be described with reference to FIGS. 7, 8 and 9.

Figure 7:
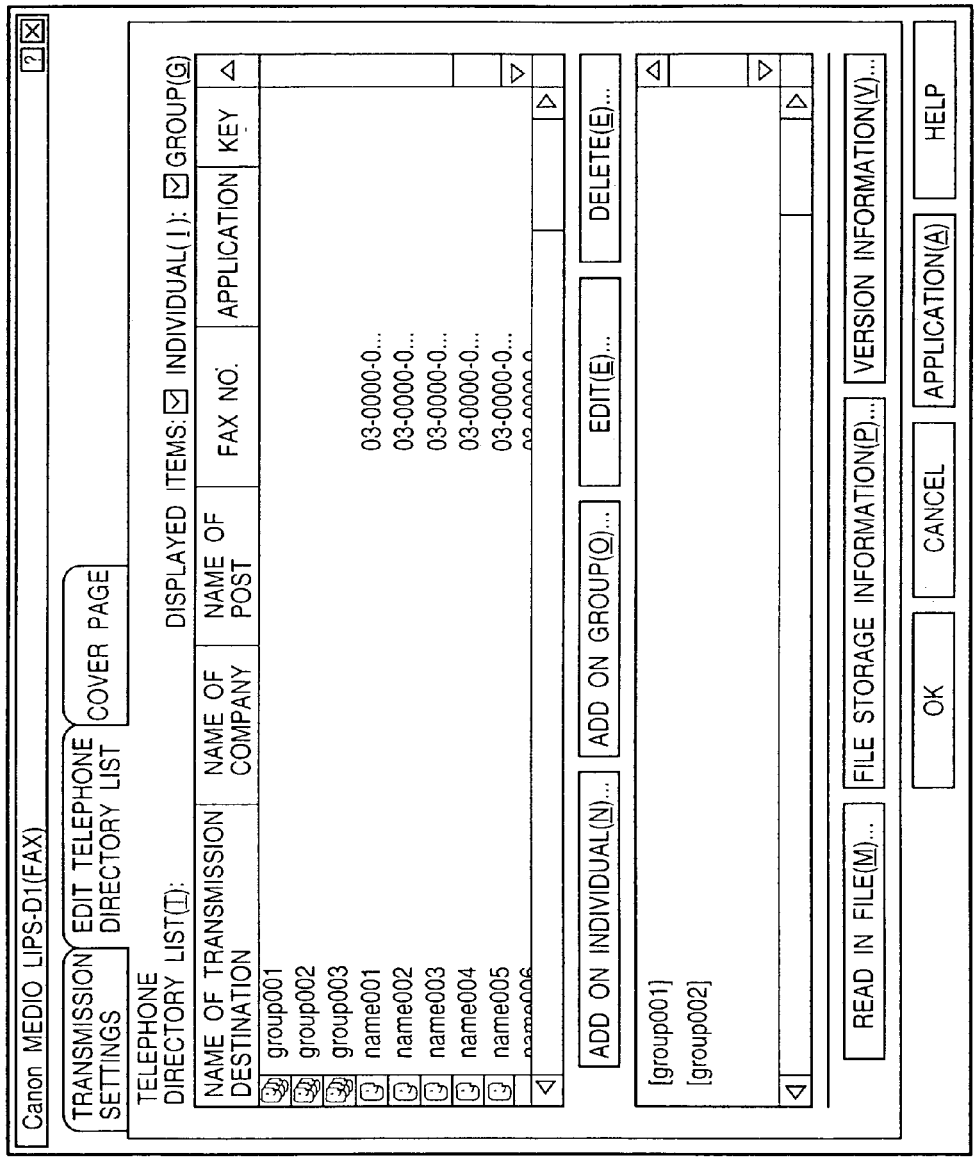
FIG. 7 is a diagram showing a configuration window according to the embodiment of the present invention.
Figure 9:
FIG. 9 is a diagram showing a configuration window according to the embodiment of the present invention.

FIGS. 7, 8 and 9 are diagrams showing configuration windows according to the embodiment of the present invention.

FIG. 7 shows a window for editing a telephone directory list. This window makes it possible to define individuals and groups that are the destinations of facsimile transmission and to register these in a database (described later) of a telephone directory list.

FIG. 8 shows a window for configuring transmission. Here a document is transmitted by facsimile to a specified transmission destination. This window makes it possible to specify a new transmission destination or to specify an individual or group, which has already been registered in the telephone directory list, as the transmission destination, and to add a new transmission destination to the telephone directory list.

FIG. 9 shows a configuration window relating to a cover page attached when a facsimile transmission is performed. There are three ways of attaching cover pages that can be selected, namely "DO NOT ATTACH", "ATTACH A SEPARATE PAGE FOR EACH SENDER", and "ATTACH THE SAME PAGE FOR ALL". In a case where a cover page is attached, the type of cover page and the content of the cover page can be set. If the user makes settings in each of these windows, clicks an OK button and closes the windows, the printer driver 203 updates the content of the database of the telephone directory list and spools the settings relating to the cover pages and the transmission settings in a facsimile information file 306 job by job.

Next, the information spooled in the facsimile information file 306 will be described with reference to FIG. 10.

FIG. 10 is a diagram illustrating information spooled in the facsimile information file according to this embodiment of the present invention.

Here individual information and group information has been stored in a database section of the telephone directory list. Information is displayed, added to, edited and deleted from the editing window of the telephone directory list shown in FIG. 7. New individual information can be added on also from the transmission configuration window shown in FIG. 8. Further, a transmission destination specified in the transmission setting window of FIG. 8 and the setting relating to a cover page specified in the cover-page related configuration window of FIG. 9 have been stored, on a per-job basis, in a job-by-job settings section. The settings relating to the cover page store the values shown in FIG. 11 in information "Cover Type" of each job. In order to store the settings job by job, a job ID is set as the identifier of each job.

After sending the command StartDoc, the application 201 sends the dispatcher 301 a page start command (GDI: StartPage), a plot command for any object included on the page and a page end command (GDI: EndDoc) successively via the graphic engine 202. The dispatcher 301 determines whether a DDI accepted from the graphic engine 202 is the result of converting a GDI, which has been sent from the application 201, by the graphic engine 202, or the result of similarly converting a GDI that has been sent from the despooler 305. In a case where the GDI has been sent from the application 201 to the graphic engine 202, the dispatcher 301 loads a spooler 302, which has been stored in the external memory 3011, in the RAM 3002 and sends a print command to the spooler 302.

Information spooled in the spool file 303 will be described with reference to FIG. 12.

FIG. 12 is a diagram illustrating information spooled in a spool file 303 according to this embodiment of the present invention The information to be spooled has the structure shown at 1201.

A job settings information section includes Job ID which identifies a job, and Destination which indicates the destination of an output. The destination is data which indicates a plurality of destinations (printout, facsimile transmission, preservation on a hard disk, etc.) of outputs from the multifunction apparatus 4000. Further, Paper Size Option, which indicates the paper size options, is set. For example, a desired paper size option from the paper size options indicated at 1202 is set by the corresponding number. Furthermore, Paper Size, which indicates the size of the paper, is set.

Settings (paper size, etc.) regarding the pages included in a job are preserved in a page settings information section. In a case where the same settings have been made for all pages, the setting for one page is preserved. If different settings have been made in one job, the number of settings that have been made are preserved.

The configuration information (Dev Mode ID) of each page, information (record type, output position, etc.) of all plot records included in each page and information concerning objects (fonts, pens, brushes, etc.) used by a plot record is spooled in a plot-object information section. Dev Mode ID specifies the particular page settings that have been preserved in the page settings information section.

The spool file 303 is generated independently by the spooler 302 for every print job executed from the application 201. The spooler 302 converts the accepted print command to an intermediate code and preserves the intermediate code on a per-page basis in the plot-object information section of the spool file 303. Further, the spooler 302 acquires the configuration information, which relates to print data set by the application on a per-job or per-page basis the printer driver 203, and preserves the information in the job settings information section and page settings information section of the spool file 303. Though the spool file 303 is generated as a file in the external memory 3011, the file may be generated in the RAM 3002.

Furthermore, the spooler 302 loads a spool file manager 304, which has been stored in the external memory 3011, into the RAM 3002 and notifies the spool file manager 304 of the status of spool file generation (job start/end, page start/end).

Processing executed by the spool file manager 304 will now be described with reference to FIG. 13.

Figure 13:
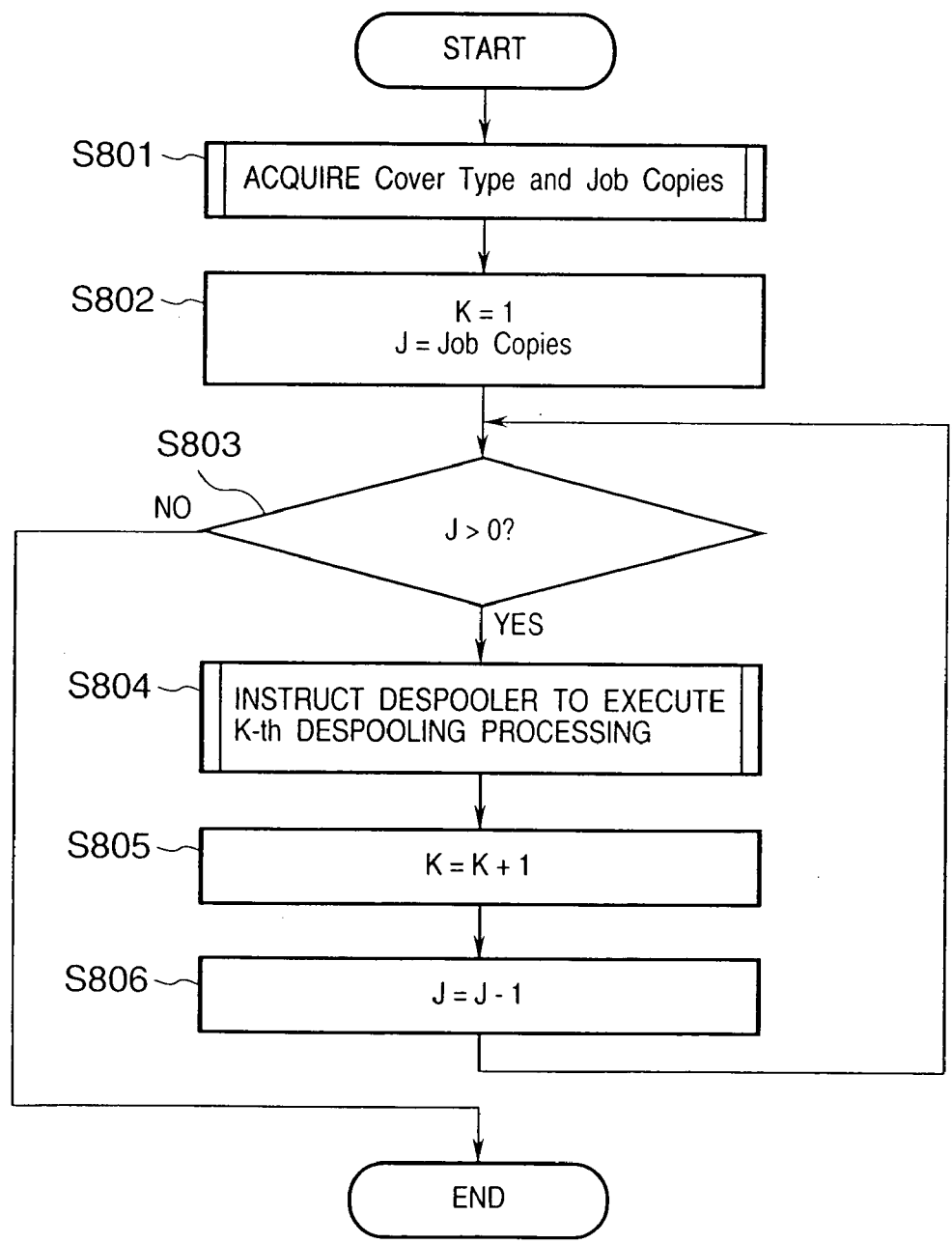
FIG. 13 is a flowchart showing processing executed by a spool file manager according to the embodiment of the present invention.

FIG. 13 is a flowchart showing processing executed by the spool file manager 304 according to this embodiment of the present invention.

At step S801 in FIG. 13, Cover Type, which indicates the cover-page attachment setting, and a Job Copies value, which signifies the total number of lobs into which a job is separated, are received from the printer driver 203. The data accepted and the meanings thereof are illustrated in FIG. 14. Further, the details of processing executed at step S801 will be described later.

Next, at step S802, the value of a variable K for counting the number of despoolings is made 1, and J is initialized to the value of Job Copies. At steps S803 to S806, processing is executed repeatedly in such a manner that despooling processing at step S804 will be executed a number of times equivalent to the total number of separated lobs (Job Copies). Processing is terminated at the moment execution has been performed the number of times equivalent to Job Copies.

More specifically, it is determined at step S803 whether J is greater than zero. If J is less than zero ("NO" at step S803), processing is terminated. If J is greater than zero ("YES" at step S803), on the other hand, control proceeds to step S804, at which the despooler is instructed of the K-th despooling processing. The details of the processing executed at step S804 will be described later. This is followed by step S805, at which K is incremented by 1, and then by step S806, at which J is decremented by 1. Control then returns to step S803.

Figure 15:
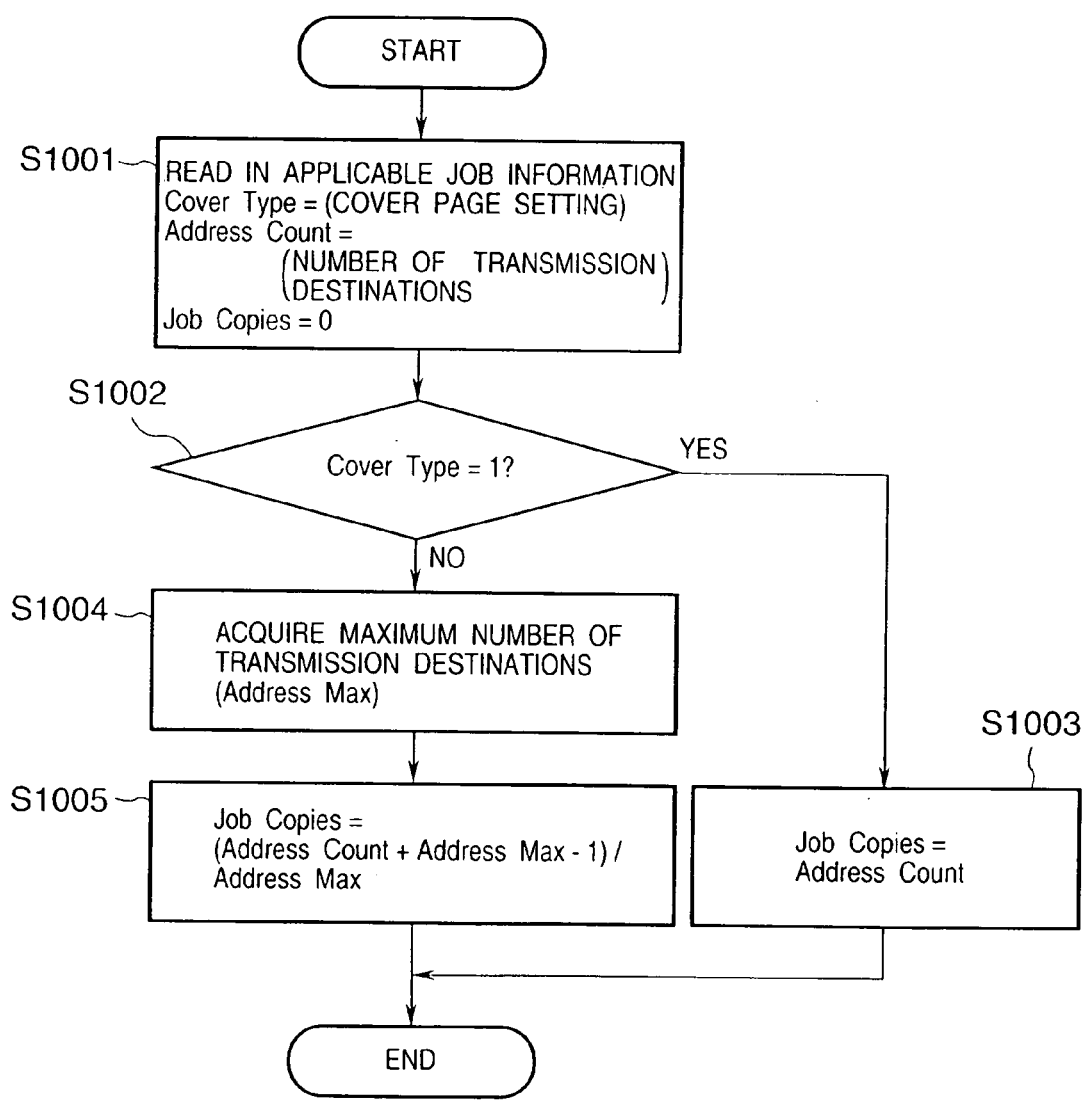
FIG. 15 is a flowchart showing the details of processing executed at a step S801 according to the embodiment of the present invention.

Reference will be had to FIG. 15 to describe the details of the processing executed at step S801, namely the processing through which the application 201 calculates Cover Type, which indicates the cover-page attachment setting, and Job Copies, which indicates the total number of separated jobs.

FIG. 15 is a flowchart showing the details of processing executed at a step S801 according to this embodiment of the present invention.

At step S1001, the application 201 reads in the applicable job information from the job-by-job settings section (see FIG. 10) of the facsimile information file 306 and initializes Cover Type and Address Count. Address Count, which is a numerical value indicating the total number of transmission destinations, is the actual number of transmission destinations obtained by totaling the numbers of destinations of individuals contained in the transmission-destination information and the number of individuals in each group contained in the transmission-destination information. The total number of separated jobs Job Copies to be calculated is initialized to zero.

Next, at step S1002, it is determined whether Cover Type has been set to 1 (meaning that a different cover page is attached for each sender). In case of 1 ("YES" at step S1002), control proceeds to step S1003, at which Address Count is set to Job Copies. This means that jobs are generated in a number equivalent to the number of transmission destinations in order to send each transmission destination a job having a different cover page attached thereto.

If it is found at step S1002 that the Cover Type is not 1 ("NO" at step S1002), i.e., if Cover Type is 0 (no cover is attached) or 2 (the same cover page is attached for all), the same job is sent to all transmission destinations. At step S1004, therefore, the largest number of transmission destinations (Address Max) to which a transmission can be made under a single job is acquired. This is followed by step S1005, at which the minimum required number of jobs [(Address Count+Address Max−1)/Address Max] is calculated and this value is set as Job Copies. Here it is assumed that the operator "/" returns an integral value obtained by discarding the remainder.

The printer driver 203 already holds the maximum number of transmission destinations of the connected multifunction apparatus 4000 as fixed-value data or acquires it from the multifunction apparatus 4000 via the bidirectional interface 3012. When the maximum number of transmission destinations is acquired from the multifunction apparatus 4000, it may be acquired directly or data that influences the maximum number of transmission destinations, such as the memory capacity of the multifunction apparatus 4000 and the disk capacity, may be acquired and the printer driver 203 may decide the maximum number of transmission destinations from this data.

Figure 16:
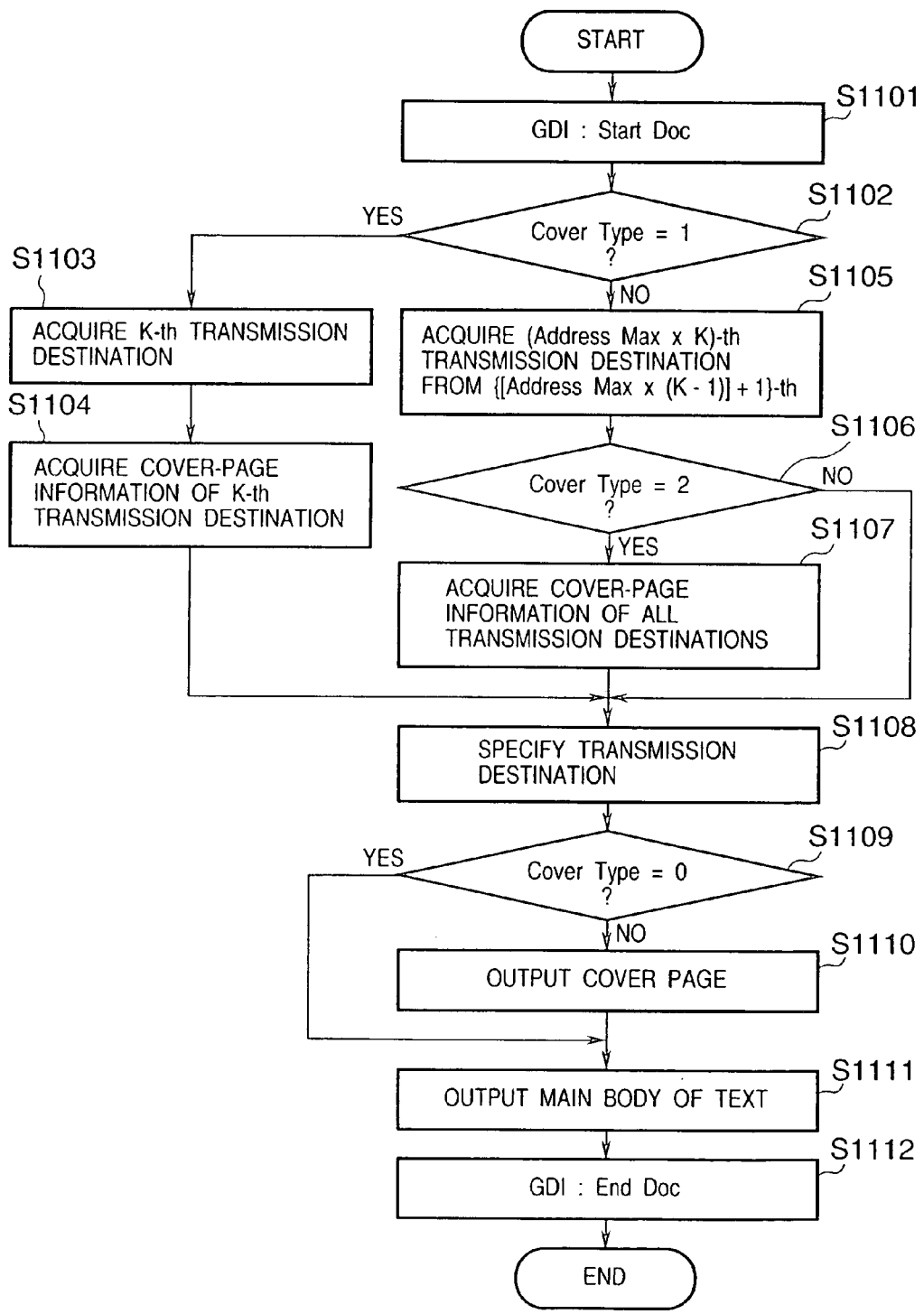
FIG. 16 is a flowchart showing the details of processing executed at a step S804 according to the embodiment of the present invention.

Reference will now be had to FIG. 16 to describe the processing executed at step S804.

FIG. 16 is a flowchart showing the details of processing executed at a step S804 according to this embodiment of the present invention.

It should be noted that the spool file manager 304 instructs the despooler 305 to execute despooling processing at step S804. At this time Job ID, which is the job identifier, the value of the variable K, which indicates how many times despooling processing has been executed, and Cover Type, which signifies the cover-page attachment setting, are delivered to the despooler 305. Here the K-th despooling processing which the spool file manager 304 has instructed the despooler 305 to perform is indicated.

First, at step S1101, the despooler 305 sends the print start command (GDI: StartDoc) to the dispatcher 301 via the graphic engine 202. The dispatcher 301 determines whether the DDI accepted from the graphic engine 202 is the result of converting a GDI, which has been sent from the application 201, by the graphic engine 202, or the result of similarly converting a GDI that has been sent from the despooler 305. If the GDI has been sent from the despooler 305 to the graphic engine 202, the dispatcher 301 loads the printer driver 203, which has been stored in the external memory 3011, in the RAM 3002 and sends a print command to the printer driver 203.

At steps S1102 to S1107, the transmission destination (the telephone number, etc., of the transmission destination) and the cover-page information (cover-page size, cover-page plot content, etc.) are acquired together with the cover-page settings (Cover Type). If Cover Type is 1 (meaning that a different cover page is attached for each sender), then, as indicated at step S1003 in FIG. 15, the total of copies into which a job is separated (Job Copies) is the number of transmission destinations (Address Count) and the processing of step S804 is executed a number of times equal to the number of transmission destinations (Address Count). In other words, in the K-th despooling processing, a cover page for the K-th transmission destination is attached and transmitted to the K-th transmission destination.

Accordingly, if it is found at step S1002 that the Cover Type is 1 (a different cover page is attached for each sender) ("YES" at step S1002), then the K-th transmission destination is acquired at step S1103. This is followed by step S1104, at which the cover-page information of the K-th transmission destination is acquired. The transmission destination and cover-page information are acquired from the printer driver 203 by the despooler 305. The printer driver 203 retrieves the K-th transmission destination from the transmission-destination information contained in the applicable job information of the job-by-job settings section of facsimile information file 306 and sends this transmission destination back to the despooler 305. Further, the printer driver 203 likewise sends the cover-page plot data of the applicable job back to the despooler 305. The content of the cover-page information will now be described with reference to FIG. 17.

Figure 17:
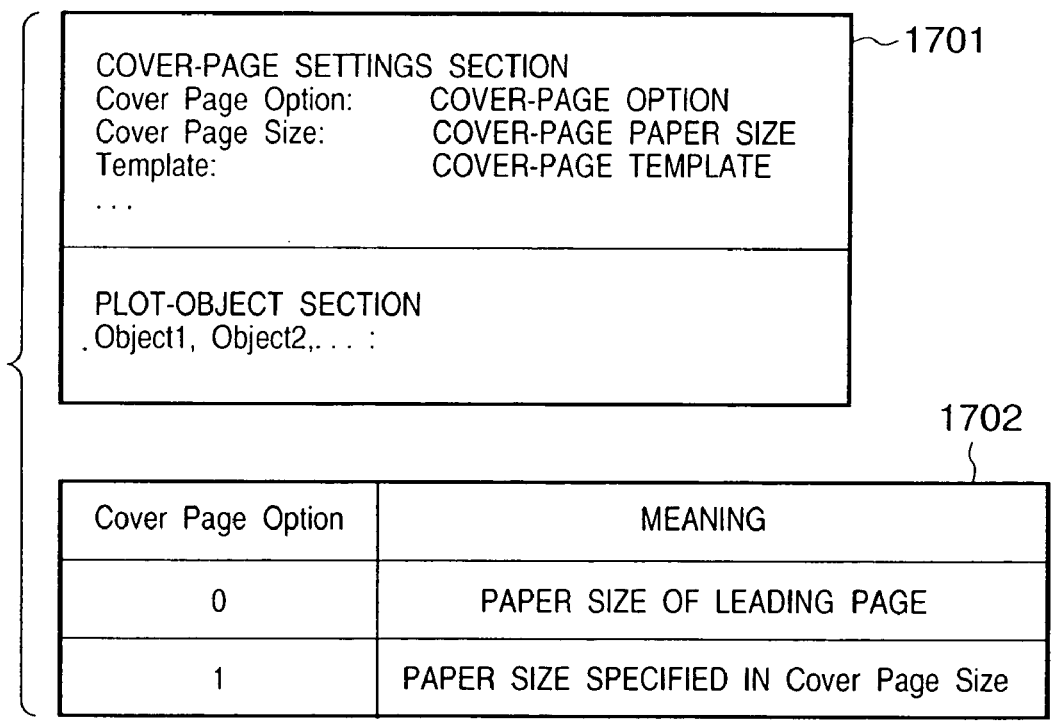
FIG. 17 is a diagram showing the content of cover-page information according to the embodiment of the present invention.

FIG. 17 is a diagram showing the content of cover-page information according to this embodiment of the present invention, The cover information has the structure indicated at 1701.

A cover-page settings section includes a setting relating to the paper size of the cover page. A template used for the cover page is specified in Template. This indicates a template specified as the type of page when the cover-page related settings shown in FIG. 9 are made. Of data rendered on the cover page, plot data of portions that are not changed by the transmission destination is defined in the template. The content is preserved in an intermediate-code format in a manner similar to that of the spool file 303. Of course, the storage format may be an ordinary metafile format capable of being rendered by the despooler 305. Further, Cover Page Option, which indicates the cover page, has been set. For example, a desired cover page option from the cover page options indicated at 1702 is set by the corresponding number. Furthermore, Cover Paper Size, which indicates the size of the cover page, has been set.

A plot-object section includes information such as the sender, transmission destination, an attention label and comments, etc. This signifies information of a plot object specified from the dialog screen of FIG. 9. Information other than the transmission destination has the same content for all separated jobs. The necessary information is therefore read out of the cover-page plot data of the applicable job in the job-by-job settings section of the facsimile information file 306 and this information is written to the plot-object section. In regard to transmission destination, the name of a transmission destination of a separated job, the facsimile number, company name and post name are read out of the directory database section of the facsimile information file 306 and written to the plot-object section. Thus, the printer driver 203 generates cover-page information and returns it to the despooler 305.

With reference again to FIG. 16, a plurality of specified transmission destinations are acquired at step S1105 if it is found at step S1102 that Cover Type is not 1 ("NO" at step S1002), i.e., if Cover Type is 0 or 2. Since the number of transmission destinations to which a transmission can be made by a single despooling process is Address Max, the transmission destination to which a transmission is made by the K-th despooling is an (Address Max×K)-th transmission destination from the {[Address Max×(K−1)]+1}-th. The transmission destination is acquired from the printer driver 203. The printer driver 203 retrieves the (Address Max×K)-th transmission destination from the {[Address Max×(K−1)]+1}-th from the transmission-destination information contained in the applicable information of the job-by-job settings section of facsimile information file 306 and sends this information back to the despooler 305.

Next, if it is found at step S1106 that Cover Type is 2 (the same cover page is attached for all) ("YES" at step S1106), the same cover page is transmitted to all transmission destinations. At step S1107, therefore, the cover-page information of all transmission destinations is acquired. The cover-page information is acquired by the despooler 305 from the printer driver 203. The latter sends back, to the despooler 305, cover-page plot data contained in the information of the applicable job of the job-by-job settings section of facsimile information file 306 and cover-page plot data relating to transmission destination contained in the telephone directory database section of facsimile information file 306. On the other hand, if it is found at step S1106 that Cover Type is not 2 ("NO" at step S1106), this means that Cover Type is 0 (no cover is attached) and, hence, cover-page information is not acquired.

At step S1108, the despooler 305 instructs the printer driver 203 of the transmission destination. The printer driver 203 responds by starting the creation of transmission data in the multifunction apparatus 4000.

The content of the transmission data will be described with reference to FIG. 18.

FIG. 18 is a diagram showing the content of transmission data according to this embodiment of the present invention.

On the basis of the transmission-destination information specified by the despooler 305, the printer driver 203 acquires a telephone number from the facsimile information file 306 and generates the data in a job control portion of the transmission data shown in FIG. 18. The generated data is transmitted to the multifunction apparatus 4000 via the system spooler 204.

With reference again to FIG. 16, it is determined at step S1109 whether or not there is a cover page, i.e., whether or not Cover Type=0. If there is a cover page ("YES" at step S119: Cover Type=1), then, on the basis of the cover-page information acquired at step S1104 or S1107, a cover page output (step S110) is performed with respect to the printer driver 203 via the graphic engine 202.

Cover Page Option is 0 (page size of cover page), the despooler 305 reads out the page configuration identifier of the leading page of the plot-object information section of spool file 303, retrieves the applicable page settings of the page-information section, acquires the paper size of the leading page and adopts this as the paper size of the cover page.

On the other hand, if Cover Page Option is 1 (page size specified in Cover Page Size, the paper size indicated by the paper ID specified in Cover Page Size of the cover-page settings section is adopted as the paper size of the cover page.

The despooler 305 executes rendering upon enlarging or reducing the plot data, which is contained in the template, in conformity with the paper size of the cover page. Further, plot data contained in the plot-object section of the cover-page information also is rendered upon being similarly enlarged or reduced at this time.

The plotting method at the time of enlargement or reduction in the despooler 305 will be described with reference to FIG. 19.

Figure 19:
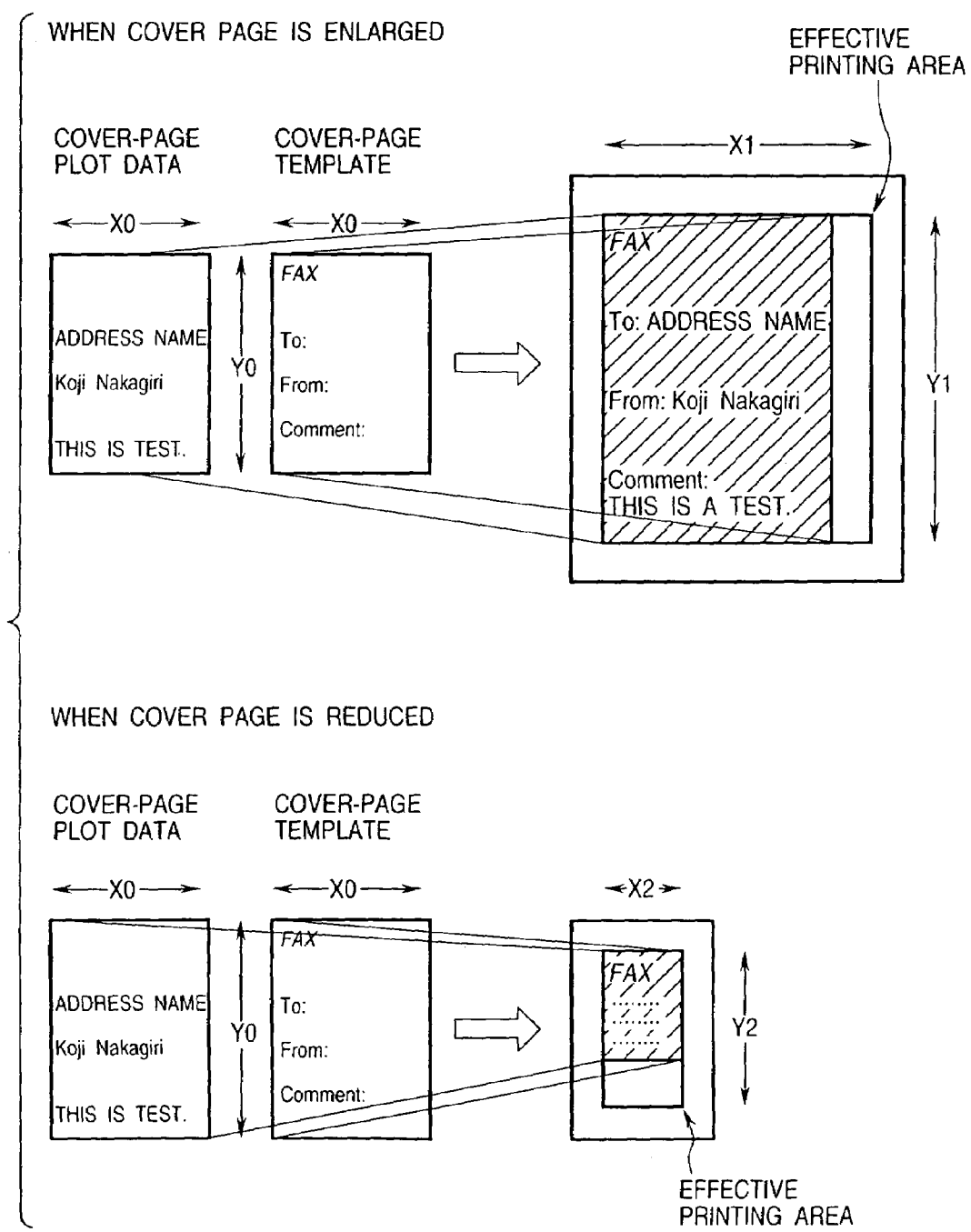
FIG. 19 is a diagram showing a plotting method at the time of enlargement and reduction in a despooler according to the embodiment of the present invention.

FIG. 19 is a diagram showing a plotting method at the time of enlargement and reduction in a despooler according to the embodiment of the present invention.

When the despooler 305 decides the size of the cover page, it obtains the size of an effective printing area on the paper from the printer driver 203. In FIG. 19, X0, Y0 indicate the size of Template, and X1, Y1 and X2, Y2 indicate the effective printing area of the paper actually output. The despooler 305 obtains the enlargement/reduction rate through the following calculation:

$$\text{Min} (X/X0, Y/Y0)$$

where Min is an operator for returning the smaller numerical value of the data enclosed by the parentheses. Further, the operator "/" returns a real-number value. The plotting content of Template is enlarged or reduced to the rectangular sizes indicated by the shading in FIG. 19. The rectangular size signifies the maximum size that can be rendered, without changing the aspect ratio, with regard to the effective printing area of the output destination. Here the output rectangle enlarged or reduced is placed so as to contact the position at the upper left of the effective printing area. However, the output rectangle may be disposed so as to be centered vertically and horizontally. Thus, the rendering of all objects in the output rectangular area that has been decided is executed upon applying the position of each object contained in Template and the enlargement/reduction rate obtained by the above-mentioned calculation in regard to the size of each object. For example, if the upper left is the origin for both Template and the effective printing area in the case of FIG. 19, then the coordinates and size of each object are multiplied by the enlargement/reduction rate found above, thereby making it possible to obtain the coordinates and size of the output-destination object.

The printer driver 203 accepts these cover-page plot commands, generates the cover-page plot data of the plot-data portion shown in FIG. 18 and transmits the data to the multifunction apparatus 4000.

With reference again to FIG. 16, the despooler 305 instructs the printer driver 203, via the graphic engine 202 and dispatcher 301, to render the plot objects of all pages contained in the plot-object information section of spool file 303 (step S1111). If Paper Size Option of the job settings section of graphic engine 202 is 0 (paper size on per-page basis) at this time, output is made with respect to the paper size indirectly specified by Dev Mode ID of each page in the plot-object information section. If Paper Size Option is 1 (paper size of leading page), then, while enlargement or reduction is performed on a per-page basis, output is carried out with respect to the paper size specified by Dev Mode ID of the leading page in the plot-object information section. If Paper Size Option is 2 (paper size specified in Paper Size), then, while enlargement or reduction is performed on a per-page basis, output is carried out with respect to the paper size indicated by the paper ID that has been specified in Paper Size in the job settings section. In regard to enlargement/reduction, the plot object of each page is output upon being enlarged or reduced through a method similar to that employed when the cover page was enlarged or reduced and then output.

The printer driver 203 accepts these plot instructions, creates the plot data of each page of the plot data portion shown in FIG. 18 and transmits this data to the multifunction apparatus 4000.

Upon receiving the transmission data shown in FIG. 18 from the printer driver 203 via the system spooler 204, the external unit 4300 expands the image information in accordance with the plot data portion of the data using the formatter 4305. If FAX has been specified in the output destination information of the job control portion of the data, the expanded image information is transferred to the facsimile unit 4301 together with the telephone number of the job control portion. The facsimile unit 4301 transmits the specified image information to the specified transmission destination. If the output destination is other than facsimile, the expanded data is transferred to the specified output destination (to the printer 4200 in case of printout and to the hard disk 4308 in case of the hard disk).

The despooler 305 sends a print end command (GDI: EndDoc) to the dispatcher 301 via the graphic engine 202 at step S1112, after which processing is terminated.

Thus, in accordance with this embodiment, as described above, a transmission document and configuring information for this document are managed as intermediate data in a spool file and the document can be transmitted to a transmission destination upon changing the content of the document while referring to the intermediate data. As a result, even if the transmission document includes a plurality of mixed paper sizes, for example, the user need not create the document again in order to uniformalize the paper sizes; the paper sizes are uniformalized automatically. Further, in order to make the size of a cover page the same as that of each transmission document, the user need not prepare cover pages whose sizes differ depending upon the transmission documents; a cover page whose paper size is the same as that of the transmission document is attached automatically.

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained by supplying a storage medium storing the program codes of the software for performing the functions of the foregoing embodiment to a system or an apparatus, reading the program codes with a computer (e.g., a CPU or MPU) of the system or apparatus from the storage medium, and then executing the program codes.

In this case, the program codes read from the storage medium implement the novel functions of this embodiment, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiment are implemented by executing the program codes read by a computer, it goes without saying that the present invention covers a case where an operating system or the like running on the computer performs a part of or the entire process in accordance with the designation of program codes and implements the functions according to the embodiments.

It goes without saying that the present invention further covers a case where, after the program codes read from the storage medium are written in a function expansion board inserted into the computer or in a memory provided in a function expansion unit connected to the computer, a CPU or the like contained in the function expansion board or function expansion unit performs a part of or the entire process in accordance with the designation of program codes and implements the function of the above embodiment.

As many apparently widely different embodiments of the present invention can be made without departing from the spirit and scope thereof, it is to be understood that the invention is not limited to the specific embodiments thereof except as defined in the appended claims.

What is claimed is:

1. An information processing system having a facsimile apparatus and an information processing apparatus, wherein:

said information processing apparatus comprises:

temporary storing means for temporarily storing, on a storage medium, output image data composed of a plurality of pages, for causing the facsimile apparatus to transmit to a receiving apparatus, as well as output configuring information;

acquisition means for acquiring output size of a prescribed page from the output configuring information of the output image data stored temporarily by said temporary storing means;

addition means for adding a cover page to the output image data;

setting means for setting the size of the cover page added by said addition means to the output size of the prescribed pare acquired by said acquisition means, and transferring means for transferring to said facsimile apparatus for causing said facsimile apparatus to transmit the cover page and the output image data to a receiving apparatus, the cover page to which the output size has been set, the output image data temporarily stored by said temporary storing means and address information of the receiving apparatus, and said facsimile apparatus comprises:

receiving means for receiving the cover page, the output image data and the address information transferred by said transferring means;

expansion means for expanding the cover page based on the size of the cover page set by said setting means; and transmitting means for transmitting the cover page expanded by said expanding means and the output image data to the receiving apparatus in accordance with the address information received by said receiving means.

2. The system according to claim 1, wherein the prescribed page is a leading page of the output image data.

3. The system according to claim 1, further comprising specifying means for specifying a change in content of the output configuring information.

4. The system according to claim 1, wherein said expanding means enlarges/reduces the size of each page of the output image data so as to obtain a size identical with output size acquired by said acquisition means.

5. The system according to claim 1, wherein if the output configuring information specifies attachment of a cover page to the output image data, said expanding means expands the cover page based upon the output size acquired by said acquisition means.

6. The system according to claim 1, wherein the output image data is facsimile-transmission image data.

7. An information processing apparatus connected to a facsimile, said information processing apparatus comprising:

temporary storing means for temporarily storing, on a storage medium, output image data composed of a plurality of pages, for causing the facsimile apparatus to transmit to a receiving apparatus, as well as output configuring information;

acquisition means for acquiring output size of a prescribed page indicating an actual output image size, from the output configuring information of the output image data stored temporarily by said temporary storing means;

addition means for adding a cover page to the output image data;

setting means for setting the size of the cover page added by said addition means to the output size of the prescribed page acquired by said acquisition means, and transferring means for transferring to the facsimile apparatus, the cover page to which the output size has been set, the output image data temporarily stored by said temporary storing means and address information of the receiving apparatus, for causing the facsimile apparatus to transmit the cover page and the output image data to a receiving apparatus.

8. The apparatus according to claim 7, wherein the prescribed page is a leading page of the output image data.

9. The apparatus according to claim 7, further comprising specifying means for specifying a change in content of the output configuring information.

10. The apparatus according to claim 7, wherein the output image data is facsimile-transmission image data.

11. A method of controlling an information processing system having a facsimile apparatus, and an information processing apparatus, said method comprising:

a temporary storing step, of temporarily storing, in the information processing apparatus, output image data composed of a plurality of pages, for causing the facsimile apparatus to transmit to a receiving apparatus, as well as output configuring information;

an acquisition step, of acquiring output size of a prescribed page from the output configuring information of the output image data stored temporarily in the information processing apparatus;

addition step, of adding a cover page to the output image data;

a setting step of setting the size of the cover page added in said addition step to the output size of the prescribed page acquired in said acquisition step, and a transferring step, of transferring to the facsimile apparatus for causing the facsimile apparatus to transmit the cover page and the output image data to a receiving apparatus, the cover page to which the output size has been set, the output image data temporarily stored in said temporary storing step and address information of the receiving apparatus, and a receiving step, of receiving the cover page, the output image data and the address information transferred in said transferring step;

an expansion step, of expanding the cover page based on the size of the cover page set in said setting step; and a transmitting step, of transmitting the cover page expanded in said expanding step and the output image data to the receiving apparatus in accordance with the address information received in said receiving step.

12. The method according to claim 11, wherein the prescribed page is a leading page of the output image data.

13. The method according to claim 11, further comprising a specifying step, of specifying a change in content of the output configuring information.

14. The method according to claim 11, wherein said expanding step includes enlarging/reducing the size of each page of the output image data so as to obtain a size identical with the output size acquired in said acquisition step.

15. The method according to claim 11, wherein if the output configuring information specifies attachment of a cover page to the output image data, said expanding step includes expands the cover page based upon the output size acquired in said acquisition step.

16. The method according to claim 11, wherein the output image data is facsimile-transmission image data.

17. A method of controlling an information processing apparatus connected to a facsimile, said method comprising:
    a temporary storing step, of temporarily storing, on a storage medium, output image data composed of a plurality of pages, for causing the facsimile apparatus to transmit to a receiving apparatus, as well as output configuring information;
    an acquisition step, of acquiring output size of a prescribed page indicating an actual output image size, from the output configuring information of the output image data stored temporarily on the storage medium;
    an addition step, of adding a cover page to the output image data;
    a setting step, of setting the size of the cover page added in said addition step to the output size of the prescribed page acquired in said acquisition step, and
    a transferring step, of transferring to the facsimile apparatus, the cover page to which the output size has been set, the output image data temporarily stored in said temporary storing step and address information of the receiving apparatus, for causing the facsimile apparatus to transmit the cover page and the output image data to a receiving apparatus.

18. The method according to claim 17, wherein the prescribed page is a leading page of the output image data.

19. The method according to claim 17, further comprising a specifying step, of specifying a change in content of the output configuring information.

20. The method according to claim 17, wherein the output image data is facsimile-transmission image data.

21. A computer-readable memory storing program code for control of an information processing apparatus connected to a facsimile, said memory having:
    program code of a temporary storing step, of temporarily storing, on a storage medium, output image data composed of a plurality of pages, for causing the facsimile apparatus to transmit to a receiving apparatus, as well as output configuring information;
    program code of an acquisition step, of acquiring output size of a prescribed page indicating an actual output image size, from the output configuring information of the output image data stored temporarily on the storage medium;
    program code of an addition step, of adding a cover page to the output image data;

program code of a setting step, of setting the size of the cover page added in said addition step to the output size of the prescribed page acquired in said acquisition step, and program code of a transferring step, of transferring to the facsimile apparatus, the cover page to which the output size has been set, the output image data temporarily stored in said temporary storing step and address information of the receiving apparatus, for causing the facsimile apparatus to transmit the cover page and the output image data to a receiving apparatus.

22. A data processing apparatus comprising:
    a connecting unit, arranged to connect with a data transmission device which transmits image to a receiving apparatus;
    a generating unit, adapted to generate data corresponding to the image data which is to be transmitted to the receiving apparatus by the data transmission device connected by said connecting unit;
    an acquisition unit, adapted to acquire size information which represents an image size of the image data corresponding to the data generated by said generating unit;
    a processing unit, adapted to execute processing to attach cover page information, which has a same size of the data generated by said generating unit, based upon the size information acquired by said acquisition unit; and
    a transferring unit, adapted to transfer, to the data transmission device through the connecting unit, the data generated by said generating unit, the cover page information which has been processed by said processing unit and address information of the receiving apparatus, for causing the data transmission device to transmit the data and the cover page information to the receiving apparatus in accordance with the address information.

23. The apparatus according to claim 22, wherein said generating unit generates image data that is based upon data that has been processed by a document processing program.

24. The apparatus according to claim 22, wherein said acquisition unit acquires the size information of an image based upon data of a leading page of the data generated by said generating unit.

25. The apparatus according to claim 22, further comprising a holding unit arranged to hold template information for generating the cover page information to be attached, wherein said processing unit generates cover page information using the template information being held by said holding unit and attaches the cover page information to the data generated by said generating unit.

26. The apparatus according to claim 25, wherein said processing unit scales the template information, which is being held by said holding unit, in dependence upon the size information acquired by said acquisition unit.

27. A data processing method comprising the steps of:
    connecting with a data transmission device which transmits image to a receiving apparatus;
    generating data corresponding to the image data which is to be transmitted to the receiving apparatus by the data transmission device connected in said connecting step;
    acquiring size information which represents an image size of the image data corresponding to the data generated in said generating step;
    executing processing to attach cover page information, which has a same size of the data generated in said generating step, based upon the size information acquired in said acquisition step; and transferring, to a data transmission device through the connecting step, the data generated in said generating step, the cover page information which has been processed in said processing step and address information of the receiving apparatus, for causing the data transmission device to transmit the data and the cover page information to the receiving apparatus in accordance with the address information.

28. A computer-readable program stored in a storage medium, comprising the steps of:

connecting with a data transmission device which transmits image to a receiving apparatus;

generating data corresponding to the image data which is to be transmitted to the receiving apparatus by the data transmission device connected in said connecting step;

acquiring size information which represents an image size of the image data corresponding to the data generated in said generating step;

executing processing to attach cover page information, which has a same size of the data generated in said generating step, based upon the size information acquired in said acquiring step; and transferring, to a data transmission device through the connecting step, the data generated in said generating step, the cover page information which has been processed in said processing step and address information of the receiving apparatus, for causing the data transmission device to transmit the data and the cover page information to the receiving apparatus in accordance with the address information.

* * * * *

UNITED STATES PATENT AND TRADEMARK OFFICE
CERTIFICATE OF CORRECTION

| | | |
|---|---|---|
| PATENT NO. | : 7,155,669 B1 | |
| APPLICATION NO. | : 09/489937 | |
| DATED | : December 26, 2006 | |
| INVENTOR(S) | : Koji Nakagiri et al. | |

It is certified that error appears in the above-identified patent and that said Letters Patent is hereby corrected as shown below:

COLUMN 2

Line 58, "format" should read --format,--.

COLUMN 5

Line 47, "I" should read --Is--.

COLUMN 6

Line 14, "graphic," should read --graphics,--; and
    Line 17, "fond" should read --font--.

COLUMN 9

Line 42, "lobs" should read --jobs--; and
    Line 52, "lobs" should read --jobs--.

COLUMN 12

Line 65, "Cover" should read --If Cover--.

COLUMN 13

Line 6, "Size," should read --Size),--.

COLUMN 16

Line 52, "addition" should read --an addition--.

COLUMN 17

Line 19, "expands" should read --expanding--.

UNITED STATES PATENT AND TRADEMARK OFFICE
CERTIFICATE OF CORRECTION

PATENT NO. : 7,155,669 B1
APPLICATION NO. : 09/489937
DATED : December 26, 2006
INVENTOR(S) : Koji Nakagiri et al.

It is certified that error appears in the above-identified patent and that said Letters Patent is hereby corrected as shown below:

COLUMN 18

Line 14, "image" should read --image data--; and
Line 57, "image" should read --image data--.

COLUMN 19

Line 13, "image" should read --image data--.

Signed and Sealed this

Tenth Day of June, 2008

JON W. DUDAS
*Director of the United States Patent and Trademark Office*